United States Patent [19]
Takeshita et al.

[11] Patent Number: 6,083,649
[45] Date of Patent: Jul. 4, 2000

[54] METHOD OF MAKING COLOR FILTER

[75] Inventors: Naoki Takeshita; Kaoru Ikeda; Yuzo Hayashi, all of Fukushima-ken, Japan

[73] Assignee: Alps Electric Co., Ltd., Tokyo, Japan

[21] Appl. No.: 09/177,732

[22] Filed: Oct. 23, 1998

[30]    Foreign Application Priority Data

Nov. 5, 1997 [JP] Japan ..................................... 9-302629
Nov. 5, 1997 [JP] Japan ..................................... 9-302645

[51] Int. Cl.[7] ............................ G02B 5/20; G02F 1/1335
[52] U.S. Cl. ............................................... 430/7; 430/200
[58] Field of Search ....................................... 430/7, 200

[56]             References Cited

U.S. PATENT DOCUMENTS 5,278,023  1/1994  Bills et al. ............................... 430/201
5,521,035  5/1996  Wolk et al. ............................... 430/20
5,725,989  3/1998  Chang et al. ............................ 430/201

OTHER PUBLICATIONS

English language Abstract of JP 8–194106, "Production of Color Filters", Kiyobumi et al. (Jul. 1996).
English language Abstract of JP 61–252501, "Manufacture of Multicolor Color Filter", Shiraishi (Nov. 1986).

*Primary Examiner*—John A. McPherson
*Attorney, Agent, or Firm*—Brinks, Hofer, Gilson & Lione

[57]            ABSTRACT

A method of making a color filter includes the steps of bringing a color film sheet provided with a heat-fusible color dye layer into close contact with a support, and heating the color film sheet to transfer the color dye layer onto the support. The color film sheet further includes a light-heat conversion layer and a base film deposited under the color dye layer, and a separating layer provided between the base film and the color dye layer. Alternatively, the color film sheet further includes a base film and a light-heat conversion layer deposited under the color dye layer, and a stress-relieving layer provided between the base film and the color dye layer.

5 Claims, 6 Drawing Sheets

METHOD OF MAKING COLOR FILTER

BACKGROUND OF THE INVENTION

1. Field of the Invention

The present invention relates to a method of making a color filter in which the color filter is formed on a glass substrate used in a color liquid crystal display device by using a color film sheet. In particular, the present invention relates to a method of making a color filter in which the transferability of the color filter onto a glass substrate is enhanced and deformations (curls) of a color film sheet during storage or use are prevented.

2. Description of the Related Art

FIGS. 9A and 9B are sectional views which show a method of making a color filter using a color film sheet that is generally used.

A color film sheet 40, shown in FIG. 9A, includes a base film 3 on which a light-heat conversion layer 4 and a color dye layer 2 are deposited in that order, and a color film sheet 50, shown in FIG. 9B, includes a base film 3 provided with a color dye layer 2 on one surface and a light-heat conversion layer 4 on another surface.

As the base film 3, a drawn resin such as polyethylene terephthalate (PET) is used. The color dye layer 2 is composed of a mixture of a resin binder and a pigment, and has any one of the colors R (red), G (green), and B (blue). One color film sheet 40 or 50 is provided with a color dye layer 2 having one color. Also, the light-heat conversion layer 4 is composed of a mixture of a resin binder and carbon powder, and generates heat by absorbing light.

As shown in FIGS. 9A and 9B, a transfer is performed by placing the color film sheet 40 or 50, provided with any one of color dye layers 2 among R (red), G (green), and B (blue), on a glass substrate 1. When light energy such as laser beams is selectively radiated onto the color film sheet 40 or 50 from above, the light-heat conversion layer 4 generates heat. The color dye layer 2 is melted by the heat to adhere to the glass substrate 1. Then, by peeling off the color film sheet 40 or 50, a transferred layer of the color dye layer 2 is formed on the glass substrate 1.

By transferring the respective color dye layers 2 of R, G, and B sequentially, a color filter in which each color is sequentially placed on the glass substrate 1 is formed.

In the color film sheet 40 shown in FIG. 9A, the light-heat conversion layer 4 is selectively irradiated with laser beams passing through the base film 3, and the laser beams are absorbed by the light-heat conversion layer 4. Heat-generation occurs only in the irradiated sections, and the color dye layer 2 is melted and transferred onto the glass substrate 1.

Also, in the color film sheet 50 shown in FIG. 9B, the light-heat conversion layer 4 absorbs laser beams first to generate heat, and the heat is transmitted through the base film 3 to the color dye layer 2. The color dye layer 2 is heated and melted to be transferred onto the glass substrate 1.

However, in the case of a transfer by means of heat produced by laser beams using the conventional color film sheet 40 or 50 as described above, with respect to the color film sheet 40 shown in FIG. 9A, the light-heat conversion layer 4 is transferred onto the glass substrate 1 along with the color dye layer 2 when the sheet 40 is peeled off. Also, with respect to the color film sheet 50 shown in FIG. 9B, the color dye layer 2 is not completely separated from the base film 3 when the color film sheet 50 is peeled off, and a portion of the color dye layer 2 remains on the base film 3, resulting in an incomplete transfer.

As a result, in the color filter produced, the black light-heat conversion layer partially remains on the transferred layers of the respective colors, or the transferred layers are not transferred in a clear pattern.

Also, since the base film 3 is composed of a resin such as PET, it has a relatively large thermal capacity. If the base film 3 is formed thickly, the heat generated by the light-heat conversion layer 4 is taken by the base film 3 during heating by laser beams. Thereby, the color dye layer 2 is not melted, is not transferred onto the glass substrate 1, and remains on the base film 3.

Because of the problems described above, the base film 3 must be formed as thinly as possible. However, if the base film 3 is formed thinly, the base film 3 will curl as shown in FIG. 10.

If the color film sheet 40 or 50 is left as a sheet, the surface of the color film sheet provided with the base film 3 will curl inward, resulting in a difficulty in bringing it into close contact with the glass substrate 1 during use.

Generally, the color film sheet 40 or 50 is stored, being wound in a roll, and it is drawn out up to an appropriate length and cut or not cut for use. In such a case, when the color film sheet 40 or 50 is drawn out, a similar curl to that described above occurs.

Therefore, there may be a difficulty in bringing the color film sheet 40 or 50 in close contact with the glass substrate 1, or wrinkling may occur on the color film sheet 40 or 50 if uncurling is attempted by force. As a result, it is not possible to transfer the color dye layer 2 clearly and surely onto the glass substrate 1, which is not practical.

The curling of the color film sheet 40 or 50 during storage presumably results from solvent components. To describe this in detail, since the light-heat conversion layer 4 is composed of a resin binder and carbon, a large amount of solvent components is contained, and since the color dye layer 2 is composed of a resin binder and a pigment, a large amount of solvent components is also contained. Therefore, the solvent components diffuse into the surface of the base film 3 on the side of the light-heat conversion layer 4, and expand. Specifically, since the surface of the base film 3 does not have high crystallinity, solvent components or the like are easily diffused into the surface, and thus a diffused surface layer easily expands. Therefore, the bottom face of the base film 3 elongates, and the top face of the base film 3 appears to shrink, resulting in a curl with the top face of the base film 3 turning inward.

SUMMARY OF THE INVENTION

The present invention has been achieved in order to solve the problems described above. It is an object of the present invention to provide a method of making a color filter, which enables a color dye layer provided on a color film sheet to be surely transferred onto a glass substrate. Also, it is another object of the present invention to provide a method of making a color filter, which prevents a base film from curling even when the base film is formed thinly to a certain degree, and enables a color dye layer to be clearly and surely transferred onto a support.

In one aspect, a method of making a color filter in accordance with the present invention includes the steps of bringing a color film sheet provided with a heat-fusible color dye layer into close contact with a support, and heating the color film sheet to transfer the color dye layer onto the support. The color film sheet includes the color dye layer, a light-heat conversion layer, and a base film deposited, and a separating layer is provided between the base film and the color dye layer.

The method is characterized by providing the separating layer between the base film and the color dye layer, and thus the color dye layer easily separates from the base film such that the color dye layer is satisfactorily transferred onto the glass substrate.

Also, in the method described above, the separating layer preferably contains a foaming agent which produces gas by heating.

That is, when the foaming agent is added to the separating layer, by selectively heating with laser beams or the like, the foaming agent in the separating layer foams only in the heated portion. Thus, a foaming section starts to emerge at the surface of the heated portion of the separating layer only. Then, unevenness is formed in the surface of the separating layer, and the area of contact between the separating layer and the color dye layer decreases. The color dye layer is separated surely and clearly. Therefore, the portion of the color dye layer to be transferred onto the glass substrate does not remain. Also, there is no foaming in the unheated portion of the separating layer, and the area of contact in the non-foaming portion between the color dye layer and the light-heat conversion layer does not decrease. Thus, when the color film sheet is peeled off, the portion of the color dye layer not to be transferred surely remains on the base film. Accordingly, a clearly patterned color filter is formed on the glass substrate.

Also, the foaming agent is preferably composed of an inorganic compound or organic compound. By producing the foaming agent with the inorganic compound, foaming can be made at low temperatures and a stable foaming temperature can be obtained.

Also, the color dye layer may be transferred directly onto the glass substrate, or, for example, a transparent electrode or a transparent protective layer may be formed on the glass substrate and the color dye layer may be transferred onto the transparent electrode or the transparent protective layer.

Also, the glass substrate, provided with the color filter produced in the method in accordance with the present invention, is placed in parallel to another glass substrate with a microscopic gap therebetween, and a liquid crystal material is filled into the gap to form a liquid crystal cell. The liquid crystal cell is mounted on a liquid crystal display device.

In accordance with the method described above, the process for forming the color filter on the glass substrate can be simplified, and the color dye layer can be transferred onto the glass substrate surely and clearly, and thus the defective percentage can be decreased, resulting in cost reductions.

In another aspect, a method of making a color filter in accordance with the present invention includes the steps of bringing a color film sheet provided with a heat-fusible color dye layer into close contact with a support, and heating the color film sheet to transfer the color dye layer onto the support. The color film sheet includes a base film, a light-heat conversion layer, and a color dye layer, and a stress-relieving layer which is in contact with the base film is provided between the base film and the color dye layer.

In accordance with the method described above, since the stress-relieving layer prevents solvent components contained in the light-heat conversion layer or the color dye layer from diffusing into the base film, the curling of the color film sheet is prevented, and thus a satisfactory transfer onto the support is performed. The support corresponds to a glass substrate, a polymeric resin film, or the like.

Also, in accordance with the method described above, the base film can be formed at a thickness of 100 μm or less, and can be formed more thinly at a thickness of 30 to 80 μm or 40 to 60 μm.

Since the base film can be formed very thinly, the heat generated in the light-heat conversion layer by laser-beam radiation is not absorbed by the base film, and thus unsatisfactory transfer owing to lack of heating can be prevented. Also, preferably the stress-relieving layer is formed in a solventless process.

In accordance with the method described above, since the stress-relieving layer contains no solvent component, solvent components do not cause expansion of the base film, and thus the curling of the color film sheet can be prevented. Also, shrinkage stress, during deposition of the stress-relieving layer, prevents the color film sheet from curling.

The solventless process preferably includes a physical deposition process under reduced pressure, which is any one among the processes of sputtering, evaporation, and photo polymerization. Among them, sputtering under reduced pressure is most preferable because high adhesion to the base film can be achieved. In sputtering under reduced pressure, continuous thin film deposition using various organic materials (resin materials), besides inorganic-materials, can be easily performed.

Also, when the stress-relieving layer is deposited by the physical deposition process or the like, the stress-relieving layer is formed so as to have a degree of polymerization which has flexibility. By the degree of polymerization having flexibility, the color film sheet provided with the stress-relieving layer can be wound as a raw fabric for storage, and the color film sheet is easily placed on the support.

Also, the stress-relieving layer is preferably formed with a resin material which has a higher glass transition temperature (Tg) than that of the light-heat conversion layer.

If a resin material which has a lower glass transition temperature than that of the light-heat conversion layer is used for the stress-relieving layer, when, for example, a color film sheet as shown in FIG. 6 is used, the stress-relieving layer 26 is melted by the heat of the light-heat conversion layer 24 during heating, the light-heat conversion layer 24 is easily separated from the base film 23, and the light-heat conversion layer 24 may adhere to the surface of the color dye layer 22 that has been transferred onto the support (glass substrate 21). Therefore, the stress-relieving layer 26 is preferably composed of a resin material which has a higher glass transition temperature than that of the light-heat conversion layer 24.

The color film sheet used in accordance with the present invention may include the light-heat conversion layer, the base film, the stress-relieving layer, and the color dye layer deposited in that order, or the base film, the stress-relieving layer, the light-heat conversion layer, and the color dye layer deposited in that order. Or, a separating layer containing a foaming agent may be provided inside the color dye layer in either one of the above cases.

In the case in which the stress-relieving layer and the color dye layer are brought into close contact with each other, the stress-relieving layer can be used as a layer for accelerating the separation of the color dye layer. Also, by imparting adhesive properties to the stress-relieving layer, the separation of the color dye layer from the base film before a transfer can be prevented.

Also, the color dye layer may be transferred directly onto the support, or, for example, a transparent electrode or a transparent protective layer may be formed on the support and the color dye layer may be transferred onto the transparent electrode or the transparent protective layer.

Also, in a liquid crystal display device which uses the color filter produced in accordance with the present invention, a glass substrate provided with the color filter is placed in parallel to another glass substrate with a microscopic gap therebetween, and a liquid crystal material is filled into the gap to form a liquid crystal cell. The liquid crystal cell is mounted on the liquid crystal display device.

In accordance with the method described above, the process for forming the color filter on the glass substrate can be simplified, and the color dye layer can be transferred onto the glass substrate surely and clearly, and thus the defective percentage can be decreased, resulting in cost reduction.

DESCRIPTION OF THE PREFERRED EMBODIMENT

A method of making color filter in accordance with the present invention will be described with reference to the drawings.

Figure 1:
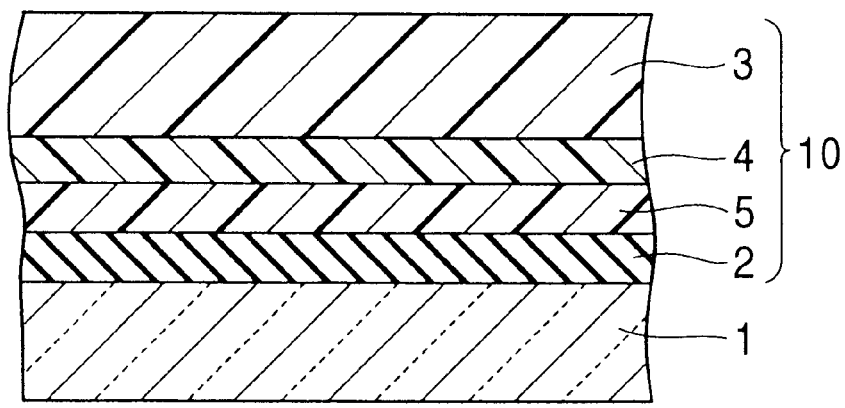
FIG. 1 is a sectional view which shows the layered structure of a color film sheet.
Figure 2:
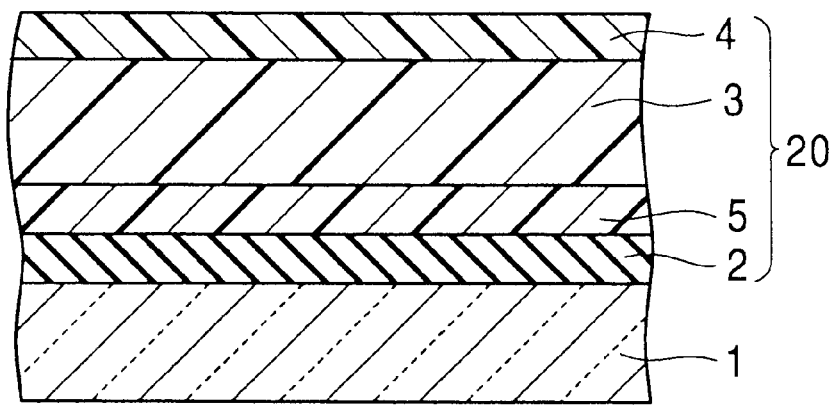
FIG. 2 is a sectional view which shows the layered structure of another color film sheet.

FIGS. 1 and 2 show color film sheets 10 and 20, placed on a glass substrate 1, respectively, which are used in making a color filter in accordance with the present invention.

The color film sheet 10 shown in FIG. 1 includes a base film 3, a light-heat conversion layer 4, a separating layer 5, and a color dye layer 2 deposited in that order.

The base film 3 is composed of a drawn resin such as PET to which heat treatment has been performed in order to relieve stress. The color dye layer 2 is composed of a resin binder, such as an epoxy resin, to which a dye or a pigment (e.g., cyan) is added. As described above, either one of color dye layers 2 of R, G, and B is provided on each color film sheet 10.

The light-heat conversion layer 4 is composed of an epoxy resin or the like to which carbon powder is added, and converts the light absorbed into heat energy.

The separating layer 5 is composed of a foaming material. As the foaming material, a material that produces gas (in particular, carbonic acid gas) by heating of the adjacent light-heat conversion layer 4 is used, and also a material that has a low thermal conductivity is used so that only the portion which is irradiated with laser beams easily foams.

As the foaming agent, although either an inorganic or organic material can be used, since the foaming temperature varies with respect to the organic material, the inorganic material is preferably used because of the constant foaming temperature. Also, since in most cases the inorganic foaming material is powdery, the inorganic foaming material is used being dispersed in a binder such as a resin.

As a material which foams by heating, an inorganic carbonate may be referred to, and specifically, sodium hydrogencarbonate ($NaHCO_3$, foaming temperature 270° C.), ammonium carbonate (($NH_4)CO_3 \cdot H_2O$, foaming temperature 58° C.), ammonium hydrogen carbonate ($NH_4HCO_3$, foaming temperature 36–60° C.), or zinc carbonate ($ZnCO_3$, foaming temperature −300° C.) is preferably used.

If an organic material that foams in a relatively low temperature range from approximately 50 to 300° C. is available, it may be used.

Preferably, the foaming temperature is sufficiently lower than a temperature at which the light-heat conversion layer 4 generates heat by absorbing laser beams, and lower than a glass transition temperature of the base film 3 (generally, approximately 120° C.). By using a foaming agent which foams at a temperature lower than the heating temperature of the light-heat conversion layer 4 and the glass transition temperature of the base film 3, the separation of the color dye layer 2 is accelerated, and the transfer of the color dye layer 2 can be performed in a short period.

The separating layer 5 containing such a foaming agent is formed by application or deposition between the base film 3 and the color dye layer 2.

The color film sheet 10 provided with the separating layer 5 as described above is placed on the surface of the glass substrate 1 (or on the surface of a transparent electrode layer or a transparent protective layer formed on the glass substrate) such that the color dye layer 2 is brought into close contact with the glass substrate 1. Laser beams are selectively radiated onto the base film 3 from above by using a laser radiation system 7 (refer to FIG. 3).

Figure 3:
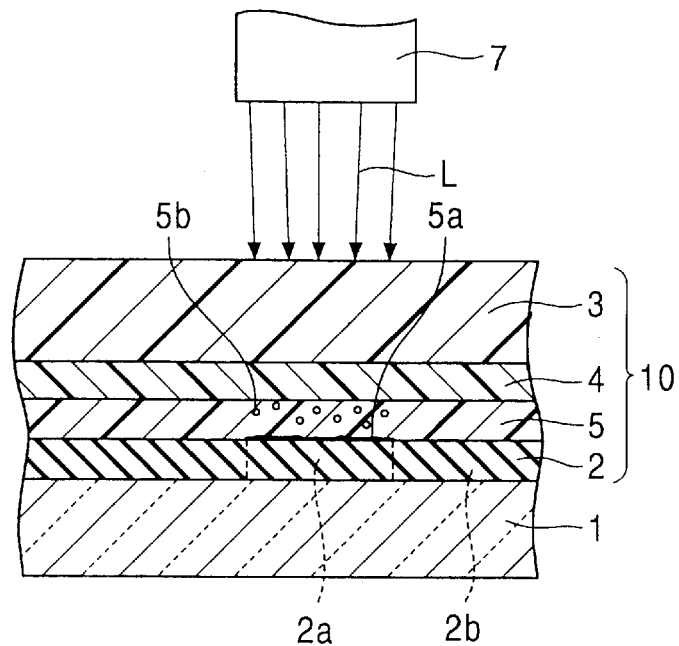
FIG. 3 is a diagram which shows a state in which a color dye layer is foaming.

FIG. 3 shows a state of the inside of the color film sheet 10 when heating is performed by the laser radiation system 7.

As shown in FIG. 3, when laser beams are selectively radiated to the color film sheet 10, laser beams L pass through the base film 3 and are absorbed by the light-heat conversion layer 4. The heat generated by the light-heat conversion layer 4 is transmitted to the separating layer 5. At this stage, the portion of the separating layer 5 irradiated with the laser beams L only foams, and a foaming section 5b moves to a surface 5a of the separating layer 5, that is, an interface with the color dye layer 2, and is revealed. Because of such a transformation, as shown in FIG. 3, the surface 5a of the separating layer 5 becomes uneven, and the area of contact between the separating layer 5 and the color dye layer 2 decreases. Also, a heated portion 2a of the color dye layer 2 is melted by heating to adhere to the surface of the glass substrate 1.

Figure 4:
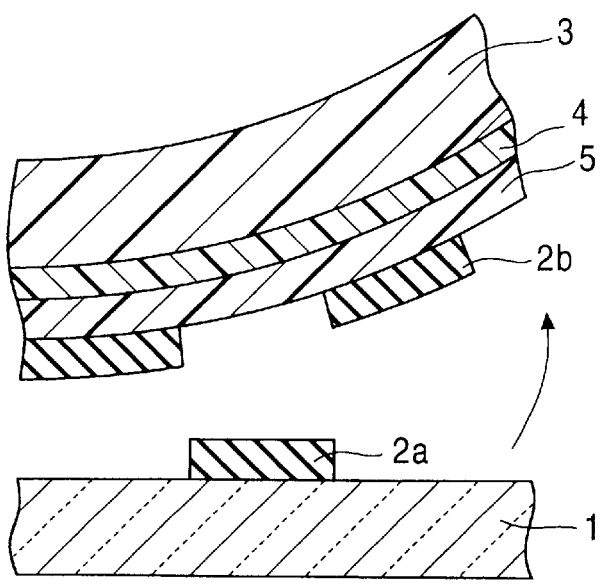
FIG. 4 is a diagram which shows a state of a glass substrate after a transfer.

FIG. 4 shows a state after the color dye layer 2 is transferred onto the glass substrate 1. The area of contact between the color dye layer 2 and the separating layer 5 that is in a foaming state is narrow in the heated portion 2a, and the color dye layer 2 in this portion is easily separated from the separating layer 5. On the other hand, the color dye layer 2 excluding the heated portion 2a, is not easily separated from the separating layer 5 because the separating layer 5 locating thereon is not in a foaming state. Also, the color dye layer 2 excluding the heated portion 2a is not adhered to the glass substrate 1 because it is not melted by heating.

Accordingly, when the base film 3 is peeled off from the glass substrate 1, the color dye layer 2 in the heated portion 2a is clearly separated from the color dye layer 2 in an unheated portion 2b, and is transferred onto the glass substrate 1. As shown in FIG. 4, the color dye layer in the heated portion 2a remains on the glass substrate 1, and the color dye layer in the unheated portion 2b remains on the base film 3, and thus a clear separation is made.

The laser radiation system 7 used is preferably provided with a semiconductor device in view of controlling, handling, and absorbency of laser beams by the light-heat conversion layer 4. The laser radiation system 7 includes, for example, a process for guiding laser beams radiating from a semiconductor device to an irradiating spot while reflecting the laser beams from a mirror, or a process for using a plurality of semiconductor devices which are connected to an irradiating spot with optical fibers. Also, at the irradiating spot, laser beams are condensed by a condensing lens for radiation to the color film sheet 10.

If the separating layer 5 has low adhesive properties, the separating layer 5 may remain on the color dye layer to be transferred onto the glass substrate 1, or at the unheated portion 2b, the color dye layer that is not melted may be separated from the separating layer 5 and may remain on the glass substrate 1. Therefore, the separating layer 5 preferably has strong adhesion to both the light-heat conversion layer 4 and the color dye layer 2. A tackiness agent may be added to the binder in the separating layer 5. Or, a tackiness agent may be added to the binder in the light-heat conversion layer 4 in order to prevent the separating layer 5 from remaining on the glass substrate 1.

Although the light-heat conversion layer 4 is preferably placed between the base film 3 and the separating layer 5, if the foaming agent in the separating layer 5 foams at low temperatures, the light-heat conversion layer 4 may be placed on the front surface of the base film 3 as shown in FIG. 2. In such a case also, the heat produced by laser beams L is transmitted to the separating layer 5 through the base film 3, and the effective separation of the color dye layer 2 onto the glass substrate 1 is expected.

In accordance with the method described above, the three types of color film sheets 10, i.e., red (R), green (G), and blue (B) are transferred onto the glass substrate 1 sequentially. As a result, a glass substrate having R, G, B color filters arrayed in a predetermined pattern is obtained, as shown in FIG. 5.

Also, in a liquid crystal display device in accordance with the present invention, a black matrix is formed on the surface of the glass substrate 1 as a preliminary step to forming the color filter.

Figure 5:
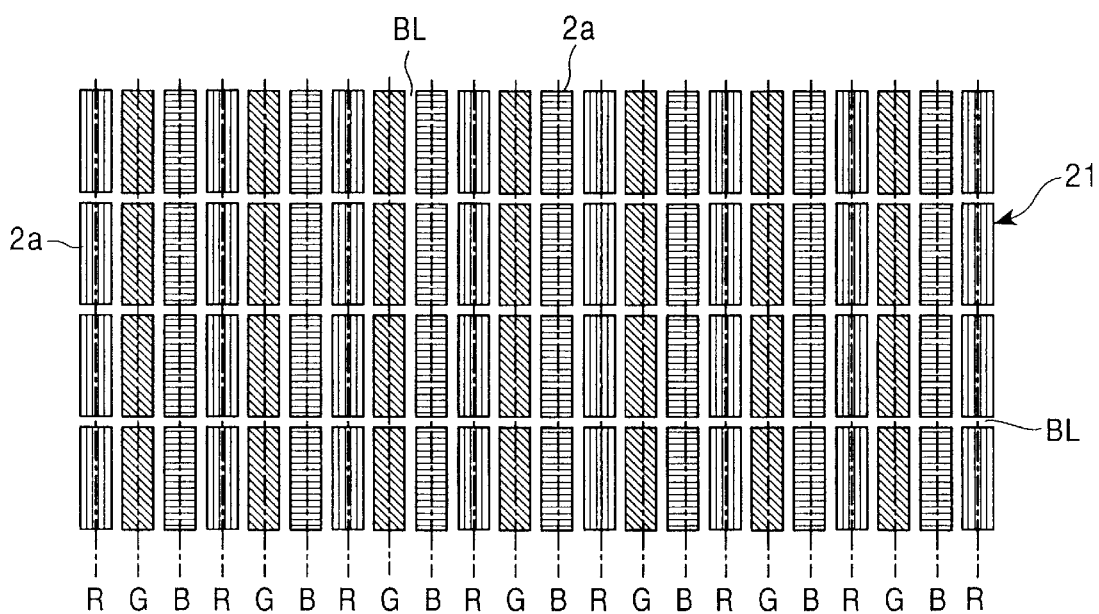
FIG. 5 is a plan-view which shows a color filter array composed of color dye layers.

As shown in FIG. 5, after color filters of the individual colors are formed on the glass substrate 1, a black matrix BL is formed for shielding spaces between pixels from light. The black matrix BL may be formed by depositing a chromium film and performing patterning by photolithography.

The glass substrate provided with the color filter as described above, and another glass substrate are bonded together and a liquid crystal material is filled into a gap between both glass substrates to produce a liquid crystal cell.

Next, a method of making color filter as another embodiment of the present invention will be described with reference to the drawings.

Figure 6:
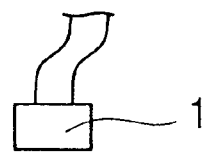
FIG. 6 is a sectional view which shows the layered structure of a color film sheet as an embodiment of the present invention.
Figure 6:
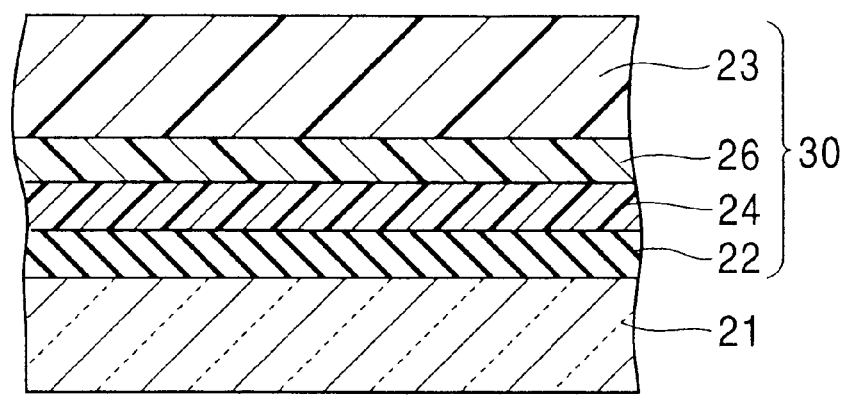
Figure 7:
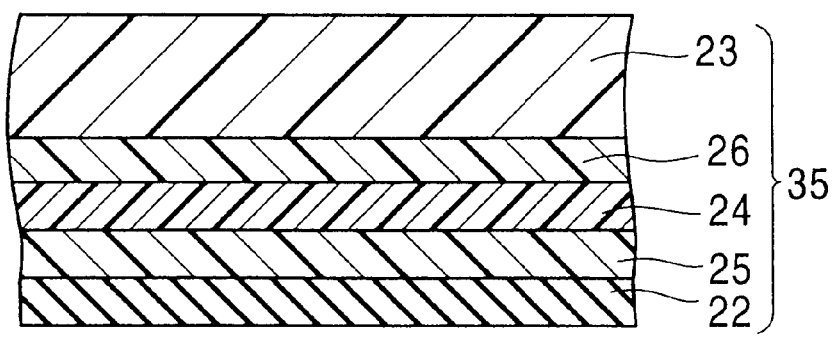
FIG. 7 is a sectional view which shows another color film sheet as an embodiment of the present invention.

FIGS. 6 and 7 show color film sheets 30 and 35, respectively, which are used in making a color filter in accordance with the present invention. (FIG. 6 shows the color filter 30 deposited on a glass substrate 21.)

The color film sheet 30 shown in FIG. 6 includes a base film 23, a stress-relieving layer 26, a light-heat conversion layer 24, and a color dye layer 22 deposited in that order.

The base film 23 is composed of a drawn resin such as PET to which heat treatment has been performed in order to relieve stress. The light-heat conversion layer 24 is composed of an epoxy resin or the like to which carbon powder is added, and converts the light absorbed into heat energy, and also has a low thermal conductivity so that the portion irradiated with laser beams only easily generates heat. The color dye layer 22 is composed of an epoxy resin, or the like, to which a dye or a pigment (e.g., cyan) is added. As described above, any one of the color dye layers 2 of R, G, and B is provided on each color film sheet 30 or 35.

The thickness of the base film 23 is preferably set at approximately 100 μm or less, more preferably set at 30 to 80 μm, or further more preferably set at 40 to 60 μm. If the film thickness is 100 μm or more, the heat generating from the light-heat conversion layer 24 during heating by laser beams will be absorbed by the base film 23, and thereby a transfer of the color dye layer 2 will not be performed satisfactorily.

The stress-relieving layer 26 must have solvent resistance, flexibility to a certain extent, and formability as a thin film, and is preferably composed of a polyamide resin, a polyimide resin, polystyrene, poly methyl methacrylate, a poly-para-xylene resin, or the like. In view of storage in a rolled form and separation after a transfer, the above-mentioned resins are used at a degree of polymerization which maintain flexibility. The degree of polymerization can be selected appropriately depending on the resin to be used. If the degree of polymerization is excessively high, the entire base film becomes hard and unusable.

In order to deposit the resins described above, a solventless process, for example, a physical deposition process under reduced pressure, may be used. Specifically, an organic material such as a polyamide resin is subjected to polymerization and sputtering under reduced pressure to form a thin film on the base film 23. Or, deposition may be performed by evaporation or photo polymerization. In particular, sputtering is most preferable because a dense and highly adhesive film can be formed.

Also, in accordance with the present invention, as the stress-relieving layer 26, a thermoplastic or thermosetting resin that has a higher glass transition temperature than that of the light-heat conversion layer 24 is deposited on the base film 23.

As such a resin material, a polyethylene resin, polyvinyl chloride, a polyamide resin, or the like can be referred to. The color film sheet 30 or 35 produced is wound up for storage and unwound in use, and thus the stress-relieving layer 26 must have flexibility.

Also, if a resin material which has a lower glass transition temperature than that of the light-heat conversion layer 24 is used for the stress-relieving layer 26, the stress-relieving layer 26 is melted by the heat of the light-heat conversion layer 24 during heating, the light-heat conversion layer 24 is easily separated from the base film 23, and the light-heat conversion layer 24 may adhere to the surface of the color dye layer 22 that has been transferred onto the glass substrate 21. Therefore, the stress-relieving layer 26 is preferably composed of a resin which has a higher glass transition temperature than that of the light-heat conversion layer 24.

FIG. 7 is a sectional view of another color film sheet used in the method in accordance with the present invention.

In the color film sheet 35, a separating layer 25 is provided between the color dye layer 22 and the light-heat conversion layer 24. The separating layer 25 contains a component which produces gas (carbonic acid gas) in the section irradiated with laser beams, that is, heated section only. The base film 23, the color dye layer 22, the light-heat conversion layer 24, and the stress-relieving layer 26 shown in FIG. 7 are composed of the same materials as those shown in FIG. 6.

As a foaming agent to be added to the separating layer 25, although either an inorganic or organic material can be used, since the foaming temperature varies with respect to the organic material, the inorganic material is preferably used because of the constant foaming temperature. When a powdery inorganic foaming agent is used, the inorganic foaming material is dispersed into a binder such as a resin.

As a material which foams by heating, an inorganic carbonate may be referred to, and specifically, sodium hydrogencarbonate ($NaHCO_3$, foaming temperature 270° C.), ammonium carbonate (($NH_4)CO_3 \cdot H_2O$, foaming temperature 58° C.), ammonium hydrogencarbonate ($NH_4HCO_3$, foaming temperature 36–60° C.), or zinc carbonate ($ZnCO_3$, foaming temperature 300° C.) is preferably used.

An organic material that foams in a relatively low temperature range from approximately 50 to 300° C. may be used.

The color film sheet 30 or 35 described above is placed on the surface of the glass substrate 21 (or on the surface of a transparent electrode layer or a transparent protective layer formed on the glass substrate) such that the color dye layer 22 is brought into close contact with the glass substrate 21. Laser beams are selectively radiated from above the base film 23 by using a laser radiation system 7 (refer to FIG. 6).

Figure 8:
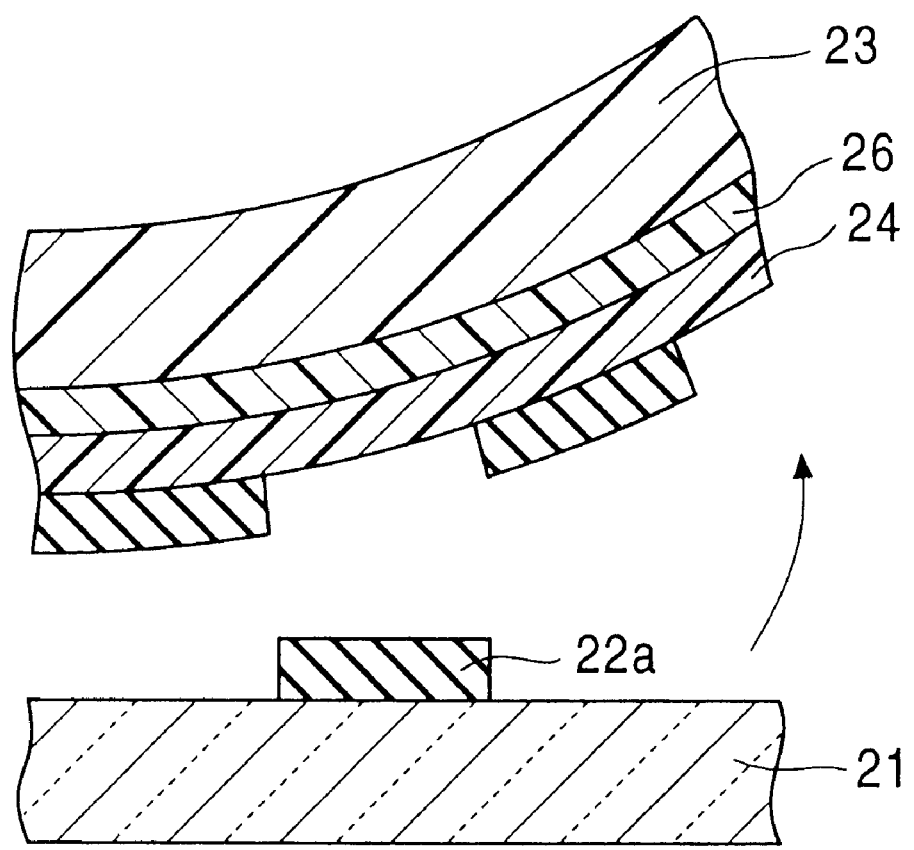
FIG. 8 is a diagram which shows a state of a glass substrate after a transfer.
Figure 9A:
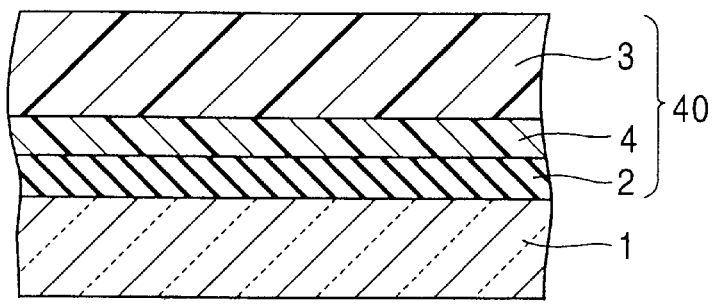
FIGS. 9A and 9B are sectional views of a layered structure of a conventional color film sheet.
Figure 9B:
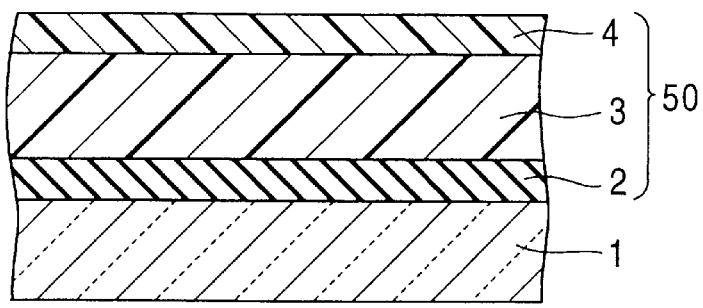
Figure 10:
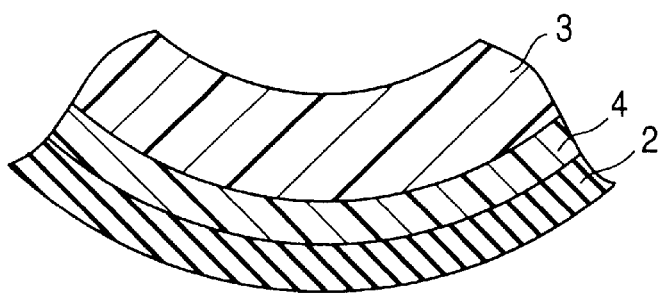
FIG. 10 is a diagram which shows a state in which a conventional color film is curled.

FIG. 8 shows a state in which the color dye layer 22 has been transferred onto the glass substrate 21. In the portion irradiated with laser beams, the laser beams are absorbed by the light-heat conversion layer 24 to generate heat. The color dye layer 22 is melted by the heat, and thus a heated portion 22a is transferred onto the glass substrate 21. On the other hand, in the portion not irradiated with laser beams, the light-heat conversion layer 24 does not generate heat, and thus the color dye layer 22 is not melted and remains on the base film 23 as the unheated portion. In the case shown in FIG. 7, the separating layer 25 foams in the heated portion only, and thus the color dye layer in the heated portion 22a is easily separated from the base film 23.

The laser radiation system 7 described above is preferably provided with a semiconductor device, as shown in FIG. 3, in view of controlling, handling, and absorbency of laser beams by the light-heat conversion layer 24.

Generally, the color film sheet 30 or 35 is stored being wound in a roll, and, when in use, it is drawn out to be placed closely on the glass substrate 21.

In the color film sheet 30 or 35, the stress-relieving layer prevents solvent components in the binder from diffusing into the base film 23. Therefore, the expansion of the surface of the base film 23 owing to the diffusion of solvent components can be presented, and thus the color film sheet can be prevented from curling.

Also, when a layer is formed on both surfaces of the base film 23, by depositing a stress-relieving layer on each surface of the base film 23 and forming the layer on each stress-relieving layer, curing or the like can be presented.

The method of making a color filter in accordance with the present invention enables a color dye layer to be surely and clearly transferred onto a glass substrate without causing irregularity in a transferred pattern.

Also, the method of making a color filter in accordance with the present invention prevents solvent components from diffusing into a base film because a stress-relieving layer is provided close to the base film, and thus even if a color film sheet is formed thinly, the color film sheet is not curled or wrinkled.

Accordingly, the base film can be formed thinly, the thermal capacity of the base film can be decreased, the heat for melting the color dye layer is not absorbed by the base film, and thus the transfer accuracy of the color dye layer can be enhanced.

What is claimed is:

1. A method of making a color filter, comprising the steps of:

bringing a color film sheet provided with a heat-fusible color dye layer into close contact with a support, and heating said color film sheet to transfer said color dye layer onto said support, wherein said color film sheet further comprises a base film and a light-heat conversion layer deposited under said color dye layer, and a stress-relieving layer provided between said base film and said color dye layer.

2. A method of making a color filter according to claim 1, wherein said base film has a thickness of 100 µm or less.

3. A method of making a color filter according to claim 1, wherein said stress-relieving layer of an organic material is formed by a solventless process.

4. A method of making a color filter according to claim 3, wherein said solventless process is a physical deposition process under reduced pressure selected from the group consisting of sputtering processes, evaporation processes, and photo polymerization processes.

5. A method of making a color filter according to claims 1, wherein said stress-relieving layer is formed of a material having a higher glass transition temperature than that of said light-heat conversion layer.

\* \* \* \* \*